US010922991B2

(12) United States Patent
King et al.

(10) Patent No.: US 10,922,991 B2
(45) Date of Patent: *Feb. 16, 2021

(54) CLUSTER ANALYSIS OF PARTICIPANT RESPONSES FOR TEST GENERATION OR TEACHING

(71) Applicant: President and Fellows of Harvard College, Cambridge, MA (US)

(72) Inventors: Gary King, Brookline, MA (US); Brian Lukoff, Boston, MA (US); Eric Mazur, Concord, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,409

(22) Filed: Jul. 2, 2019

(65) Prior Publication Data

US 2019/0340948 A1     Nov. 7, 2019

Related U.S. Application Data

(63) Continuation of application No. 13/871,627, filed on Apr. 26, 2013, now Pat. No. 10,388,177.
(60) Provisional application No. 61/639,260, filed on Apr. 27, 2012.

(51) Int. Cl.
*G09B 7/00* (2006.01)
(52) U.S. Cl.
CPC ........................ *G09B 7/00* (2013.01)
(58) Field of Classification Search
CPC ........................................ G09B 7/00
See application file for complete search history.

(56) References Cited

U.S. PATENT DOCUMENTS

| 7,099,819 B2* | 8/2006 | Sakai | G06F 16/355 704/1 |
|---|---|---|---|
| 2003/0008270 A1* | 1/2003 | Fleishman | G09B 7/00 434/322 |
| 2008/0126319 A1* | 5/2008 | Bukai | G06F 16/951 |
| 2009/0202969 A1* | 8/2009 | Beauchamp | G09B 7/00 434/335 |
| 2010/0191686 A1* | 7/2010 | Wang | G09B 7/02 706/46 |

* cited by examiner

*Primary Examiner* — Eddy Saint-Vil
(74) *Attorney, Agent, or Firm* — Quarles and Brady LLP

(57) ABSTRACT

Textual responses to open-ended (i.e., free-response) items provided by participants (e.g., by means of mobile wireless devices) are automatically classified, enabling an instructor to assess the responses in a convenient, organized fashion and adjust instruction accordingly.

19 Claims, 4 Drawing Sheets

CLUSTER ANALYSIS OF PARTICIPANT RESPONSES FOR TEST GENERATION OR TEACHING

CROSS-REFERENCE TO RELATED APPLICATIONS

This application is a continuation of U.S. application Ser. No. 13/871,627, filed under the same title on Apr. 26, 2013, which claims priority to U.S. Provisional Patent Application No. 61/639,260, filed on Apr. 27, 2012, the entire contents of which are incorporated herein by reference.

GOVERNMENT RIGHTS

This invention was made with Government support under National Science Foundation award IIS-0835338. The Government has certain rights in the invention.

FIELD OF THE INVENTION

In various embodiments, the present invention relates generally to cluster analysis of participant responses for test generation or teaching.

BACKGROUND

Multiple-choice items are easy to administer from a technical standpoint, but are often difficult and time-consuming to write because they require a comprehensive understanding of all possible responses that a participant might give. For questions with a single correct answer, this means anticipating all likely wrong answers based on a deep understanding of all the misconceptions and misunderstandings that might lead a participant to respond incorrectly. Even for questions without a single correct answer (e.g., attitudinal questions), it can be difficult to predict all possible opinions that a participant might have when faced with the item prompt. Developing response options for multiple-choice items is challenging enough to merit numerous sets of published guidelines and rules; see, e.g., Haladyna, Downing, & Rodriguez, "A review of multiple-choice item-writing guidelines for classroom assessment," *Applied Measurement in Education,* 15(3), 309-333 (2002).

In contrast, asking participants to respond to free-response items instead of multiple-choice items solves this particular problem but presents its own set of difficulties. Contrasted with supervised learning analysis, which may involve either an algorithmic definition or a training set of classified entries, the underlying clustering of the unsupervised learning for the participant responses is unknown. In addition, some rare types of free-response items can be scored automatically (see, e.g., Attali & Burstein, "Automated essay scoring withe-rater v.2," *Journal of Technology, Learning, and Assessment,* 4(3), 1-31 (2006); Bennett, Morley & Quardt, "Three Response Types for Broadening the Conception of Mathematical Problem Solving in Computerized Tests," *Applied Psychological Measurement,* 24(4), 294-309 (2000)), however, the time and monetary costs to set up and use such a system can make them infeasible. Furthermore, without a way of automatically scoring or classifying item responses, an instructor cannot process dozens or hundreds of participant responses in real time to dynamically adjust instruction, as is the goal with any formative assessment technique.

Consequently, there is a need for an approach using unsupervised learning that automatically classifies or scores participant responses to open-ended items and provides real-time feedback to the instructor.

SUMMARY

The present invention addresses this problem by facilitating automatic classification or scoring of participant textual responses to open-ended (i.e., free-response) items, enabling an instructor to assess the responses in a convenient, organized fashion and adjust instruction accordingly. In various embodiments, students enter responses to the open-ended items posed by the instructor using a handheld device, e.g., a laptop computer or cell phone with web access. The term "item" as used herein refers to a question that an instructor poses to participants and that participants respond to, e.g., using handheld devices. Items may attempt to assess factual information, tease out conceptual difficulties, or measure participants' opinions. Although the present discussion focuses on students in a college classroom environment, it should be understood that the approach described herein is applicable to participants in any group pedagogical or intellectual endeavor, and the terms "student" and "participant" are used herein interchangeably.

Key to the present invention is the application of clustering techniques to identify "exemplar" responses from a collection of student answers. Whereas today instructors sift through long lists of answers and haphazardly read a few in an effort to detect, for example, the various ways in which students may stray from proper reasoning, the present invention utilizes cluster analysis to find the different types of answers, mistakes, and ideas students give, and based on this analysis, picks one or a small number of exemplar answers for the instructor to much more quickly read.

Accordingly, in a first aspect, method of analyzing and sorting at least one participant's textual responses to a free-response item. In various embodiments, the method comprises the steps of providing the free-response items to a plurality of participants; receiving textual responses from at least some of the participants; computationally processing the textual responses into clusters of response types; identifying an exemplar that typifies each of the response types; and reporting the textual responses corresponding to the exemplars. The method may further comprise generating a multiple-choice version of the free-response item using a plurality of the most highly-ranked exemplar responses.

In some embodiments, the textual responses are processed into clusters represented as numerical vectors, and the method may further comprise the steps of computationally clustering the numerical vectors according to a plurality of clustering algorithms, where each algorithm produces an ensemble of clusters in a vector space and the resulting plurality of ensembles overlaps no more than partially in the space; within at least some of the clusters, identifying an exemplar vector that is spatially closest to the largest number of other vectors; ranking each of the identified exemplar vectors in terms of its distance from the other exemplar vectors; and reporting the ranked list.

The method may further comprise pruning cluster ensembles having a similarity to other cluster ensembles that exceeds a threshold. In some embodiments, identifying the exemplar comprises measuring the distance between any two responses based on similarity of a number of common stemmed n-grams in each response. The free-response items are wirelessly provided to handheld devices associated with the participants in a participant database.

In some embodiments, the method further comprises the step of deriving a metric specifying a distance between clusters in the ensembles, where exemplar vectors are identified only for clusters whose distance metric from all other clusters exceeds a threshold.

The item may be a question and the method may further comprise the step of using the exemplars to predict prototypical responses to the question. The method may comprise the step of computationally generating choices in a multiple-choice version of the question.

In another aspect, the invention pertains to a system for analyzing and sorting at least one participant's textual responses to a free-response item. In various embodiments, the system comprises a memory for storing a participant database comprising records each specifying a participant, a mobile device associated with the participant, and textual responses to free-response items provided by the participant via a mobile device; and a processor in operative communication with the memory. The processor is configured to (i) computationally process the textual responses into clusters of response types; (ii) identify an exemplar vector that typifies each of the response types; and (iii) cause the textual responses corresponding to the exemplar vectors to be displayed.

In various embodiments, the processor is further configured to (i) computationally process the textual responses into numerical vectors;

(ii) computationally cluster the numerical vectors according to a plurality of clustering algorithms, where each algorithm produces an ensemble of clusters in a vector space and the resulting plurality of ensembles overlaps no more than partially in the space; within at least some of the clusters, identify an exemplar vector that is spatially closest to the largest number of other vectors; (iv) rank each of the identified exemplar vectors in terms of its distance from the other exemplar vectors; and (v) cause the textual responses corresponding to the ranked exemplar vectors to be reported in a ranked list to the instructor. The processor may be further configured to prune cluster ensembles having a similarity to other cluster ensembles that exceeds a threshold and/or to identify the exemplar vector by measuring the distance between any two responses based on similarity of a number of common stemmed n-grams in each response.

In some embodiments, the processor is further configured to generate a multiple-choice version of the free-response item using a plurality of the most highly-ranked exemplar responses. The system may wirelessly communicate the free-response items to handheld devices associated with the participants in a participant database.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1A:
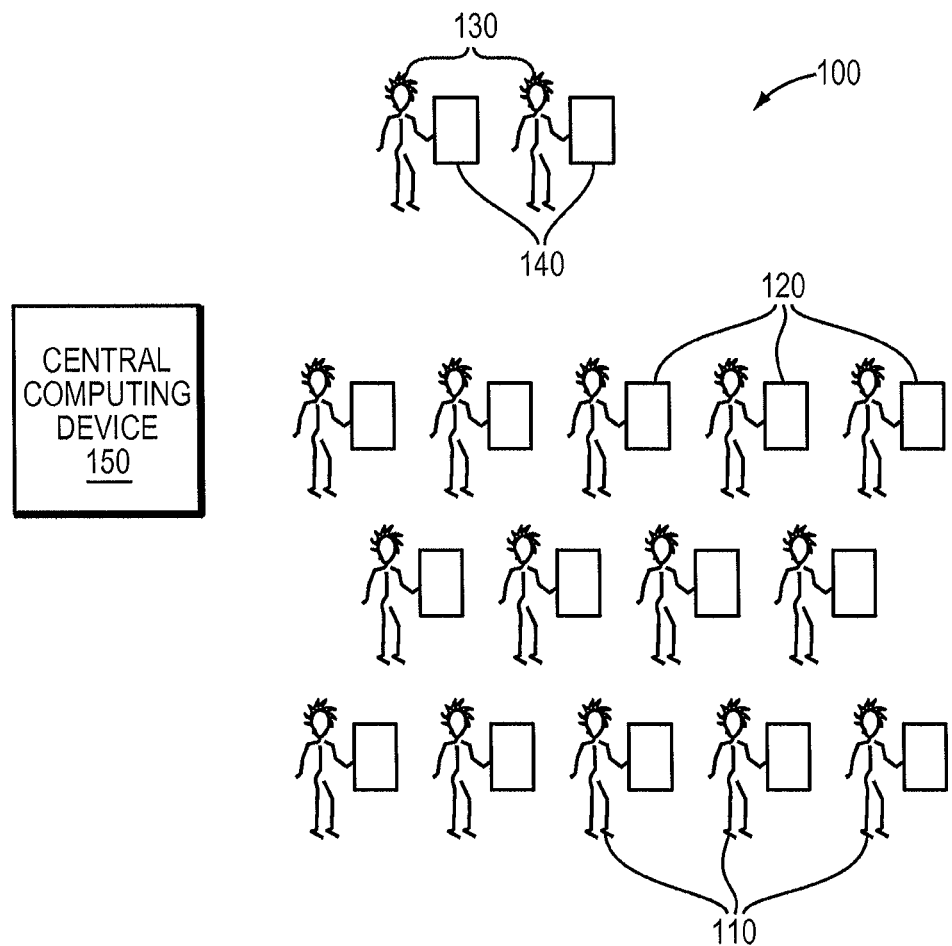
FIG. 1A schematically illustrates an activity involving communication between participants and instructors.

FIG. 1A depicts an exemplary event or activity 100 where a gathering of participants or students 110, each having a handheld device 120, respond to one or more open-ended items posed by one or more instructors or organizers 130, who also may each have a handheld device 140. Again, the nature of the activity is not material to the invention, nor are the specific roles of instructor and participant; instructor(s) 130 may, for example, be chosen from the participants 110 or may be a different group of people. What is important is for the activity to involve the transmission of the posed open-ended items and the ability to gather responses from the participants.

The participants 110 and the instructor(s) 130 may directly communicate via the handheld devices 120, 140 or indirectly via a central computing device 150. The handheld devices 120, 140 may be, for example, computers, cell phones, tablets or other electronic devices that transmit participants' responses, attitudes, opinions, knowledge, characteristics, and/or understanding of relevant subject matter or items to one another, to the instructor(s) 130 and/or to the central computing device 150 via a network. The transmitted subject matter may be in response to a question or a discussion topic that the instructor(s) 130 pose(s) to participants 110. In one representative implementation, the participants 110 are students, the event 100 is a class and the instructor 130 is a professor or teacher who wishes to gauge student understanding of pedagogic content. The students may be co-located or geographically dispersed (e.g., participating in distance learning classes). In another embodiment, the activity is a corporate training event attended by employees or a workshop attended by workshop participants where the session leader wishes to gauge the opinions or responses of the participants. A person of ordinary skill in the art will appreciate that the invention described herein may be applicable to any group of participants pursuing pedagogical, intellectual or business endeavors.

In accordance with the invention, an algorithm adapted to the problem of automatically selecting a small set of exemplar responses is applied, and the instructor may use the resulting exemplar responses as the basis for whole-class discussion in real time, or as response options for a new multiple-choice question that can be administered in a future event. Exemplars may be selected via text analysis of open-ended text responses automatically as described in the ensuing discussion.

Figure 1B:
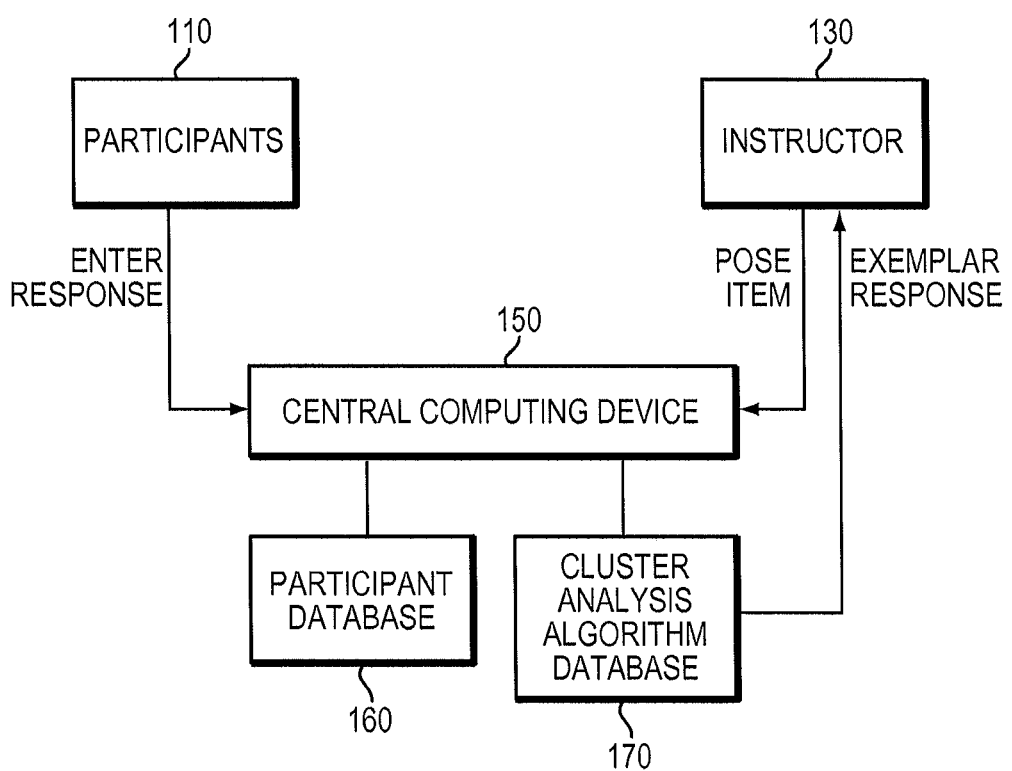
FIG. 1B is a block diagram illustrating deployment of a representative system in accordance with the current invention.

Referring to FIG. 1B, at the beginning of the event, the instructors 130 may wirelessly or otherwise (e.g., by means of a wired connection) transmit their open-ended items to the participants (collectively indicated at 110) directly or to a central computing device 150, which communicates the items to the participants 110 via a network; the participants 110 then may wirelessly or otherwise (e.g., by a wired connection) transmit their responses to the items to the central computing device 150 via a network, where their responses are stored in a participant database 160. The central computing device 150 may be implemented in the instructor's handheld device or in a separate, independent system in wireless (or wired) communication therewith. The instructor 130 may select one or more cluster-analysis algorithms for use in connection with the items that will be provided to the participants 110, and transmits the selected option(s) to (or enters it into) the central computing device 150; cluster analysis algorithms are stored in an algorithm database 170. The central computing device 150 performs clustering based on characteristics of the participants and the selected cluster analysis algorithm. The results of the analysis typically include a computed exemplar response of the clustering (and its rank order), which is automatically communicated to the instructors 130 via their handheld devices.

The approach of the invention is to cluster and analyze student responses so that conceptually similar responses are grouped together. Embodiments of the current invention identify an "exemplar response" (i.e., a response that exemplifies whatever pattern is apparent among the responses in that cluster) from each meaningful cluster and then present to the instructor one or more of these exemplar responses that are found to be most different from each other.

In one embodiment, it is recognized that different algorithms and different parameters for those algorithms will cluster responses together in different ways. Rather than trying to focus on the "best" way of clustering all of the responses, the present invention recognizes that there are many meaningful ways to do so. Accordingly, in this embodiment, multiple clustering algorithms are preferably applied, resulting in overlapping clusters because different algorithms produce different partitions of the responses. If there are 20 responses, for example, there are about a million different possible clusters, but perhaps the algorithms employed will together identify only a small subset of those as meaningful (i.e., grouping a set of responses that are all similar in some way). A representative approach adapts the computer-assisted method set forth in Grimmer & King, "General Purpose Computer-Assisted Clustering and Conceptualization," Proceedings of the National Academy of Sciences (2011) (hereafter "G&K," the entire disclosure of which is hereby incorporated by reference).

In other embodiments, one or more traditional clustering algorithms are employed. Any clustering algorithm that permits identification of exemplar responses may be used to advantage. Suitable techniques are described, for example, in Guojan Gan, Chaoqun Ma, and Jianhong Wu, *Data Clustering: Theory, Algorithms, and Applications*, Siam, 2007; Leonard Kaufman and Peter Rousseeuw, *Finding Groups in Data: An Introduction to Cluster Analysis*, New York: Wiley (1990), and in Frey, B. J. and Dueck, D., "Clustering by Passing Messages Between Data Points," *Science* 315(5814):972 (2007). The entire disclosures of these reference are hereby incorporated by reference.

In the following discussion, the term "n-gram" refers to a sequence of n words from a document (in this case free-text student responses). So, in the previous sentence, each word is a 1-gram, the phrases "a sequence" and "sequence of" are 2-grams, etc. "Stemming" is the process of taking a word and reducing it to its basic root. For example, in the previous sentence the stems would be "stem" for "stemming," "reduce" for "reducing", etc. In this way, the terms "reduce" and "reducing" are recognized as the same for purposes of analysis. A "stemmed n-gram" is an n-gram where each word is reduced to its stem. Algorithms for stemming are conventional in the art.

In some embodiments, the procedure represents each clustering as a point in a two-dimensional space, such that clusterings (points) close together in the space are almost the same, and those farther apart may warrant a closer look because they differ in some important ways. In effect, this visualization translates the uninterpretable chaos of huge numbers of possible clusterings into a simple framework that instructor can comprehend and use to efficiently select one or small number of clusterings that conveys the most useful information.

Figure 2:
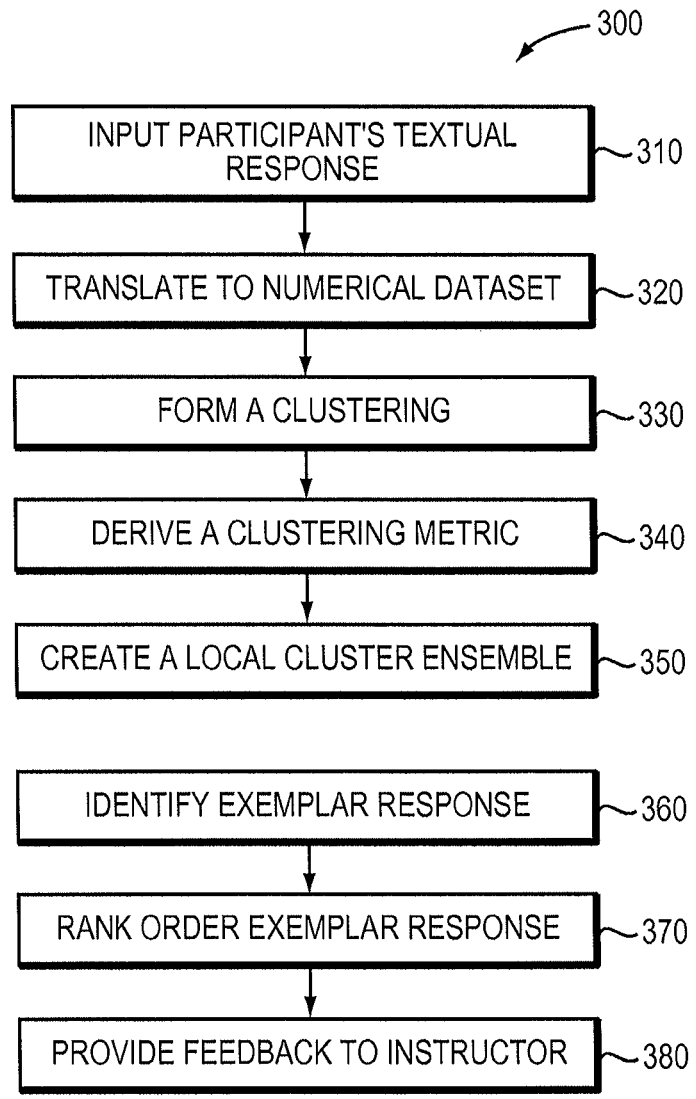
FIG. 2 depicts a method for cluster analysis and feedback generation in accordance with embodiments of the current invention.

A representative method 300 for analyzing participants' responses to an open-ended item in accordance with embodiments utilizing the G&K approach is shown in FIG. 2, and the representative steps for creating a vector space of clusterings are as follows.

First, a set of textual documents 310 is translated to a numerical dataset in the step of 320. This step is necessary only when the items to be clustered are text documents or in general not already numerical. For each set of text documents of variable length, a common framework is used to represent them quantitatively. This may involve transforming the text to numbers by removing punctuation, stemming the words, computing 1, 2, 3, 4, and 5-grams, removing stemmed n-grams that appear in fewer than 1% or more than 99% of the responses, and finally representing each response as a vector summarizing the presence or absence (or for some purposes a count) of each stemmed n-gram. For English documents, about 3,500 unique word stems usually remain in the entire corpus. Each document is then coded with a set of (about 3,500) variables, each corresponding to the number of times a word stem is used in that document. Since most human language is highly repetitive, this representation is usually more than adequate. This general procedure can also be applied to multiple representations of the same documents, e.g., term-weighting representations such as tf-idf (term frequency/inverse document frequency), part-of-speech tagging, tokenization rules such as replacing "do" and "not" with "do_not", etc. Likewise, variants of kernel methods—procedures to produce a similarity metric between documents without explicitly representing the words in a matrix—can also be utilized as the basis for the numerical representation.

In step 330, a plurality of clustering algorithms is applied, one at a time, to the numerical dataset. Each approach may represent different substantive assumptions that are difficult to express before their application, but desirable effects result from the fact of their differences rather than the nature of those differences. Virtually any computationally efficient clustering methods can be employed in combination in this step, so long as the result is that each document assigned either to a single cluster or to different clusters with weights that sum to 1. Representative clustering techniques are listed in the SI Appendix to G&K, available at http://www.ncbi.nlm.nih.gov/pmc/articles/PMC3041127/ (incorporated herein by reference).

Ideally, the clusters generated by the different clustering algorithms are separable, i.e., they produce clusters that do not overlap significantly if at all. One approach to generating such clusters is to use as many different clustering techniques as necessary to produce, from the numerical dataset, three or four clusters that do not overlap. Alternatively, the approach of G&K may be used and a large number of clustering algorithms applied to the dataset, thereby forming a space (e.g., a vector space) of clusterings; then, three or four points equidistant from each other in the space are selected and those clusters employed for the remainder of the analysis as described below. Still another approach is to apply several existing cluster analysis methods, such as the well-known k-means algorithm, and use the outputs of these directly—specifically, the output of each of these algorithms is a clustering of responses, which is added to the clusterings found by other algorithms. But it may be that, for example, k-means produces a clustering that is not very different from the clustering produced by other algorithms (e.g., if there were 26 responses A-Z and one algorithm produces two groups, A-K and L-Z, and k-means produces two groups consisting of A-L and M-Z). Accordingly, some of these clusterings may be discarded if they are too similar to the clusterings already found using other methods, since they do not enhance the separability exploited by the current invention.

In step 340, a distance metric is derived to measure the similarity between any pair of clusters. Each clustering represents a partitioning of the participant responses to an item into mutually exclusive and exhaustive categories—that is, each clustering represents an ensemble of clusters. Typically, the clusterings are relatively dissimilar. The similarity metric should satisfy several criteria. First, the distance should be a function of the number of pairs of documents not placed together (i.e., not found in the same cluster) in both clusterings. Second, the distance should be invariant to the number of documents, given any fixed number of clusters in each clustering. Third, a scale is set by fixing the minimum distance to zero and the maximum distance to log(k), where k is the number of clusters.

In step 340, the metric established in step 330 is used to create a metric space of clusterings, along with a lower dimensional Euclidean representation useful for visualization. The matrix of distances between each pair in the set of J clusterings can be represented in a J-dimensional metric space, which is projected down to two Euclidean dimensions for visualization purposes. Because projection entails the loss of information, a multidimensional scaling method that retains the most crucial information is employed. In particular, it is the small distances that should be preserved most accurately because these reflect the clusterings to be combined (in the next step) into local ensembles. As the distance between two clusterings increases, a higher level of distortion will affect the results less. The well-known Sammon multidimensional scaling algorithm satisfies these criteria and may be used to advantage.

Optionally, in step 350, a "local cluster ensemble" method is used as a way to summarize any point in the space. This allows for the fast exploration of the space, ensuring that users of the system are able to quickly identify partitions useful for item on which the participants have responded. A "cluster ensemble" is a technique used to produce a single clustering by averaging in a specific way across many individual clusterings. To preserve local diversity and avoid the infinite regress resulting from clustering a set of clusterings, the method generates local cluster ensembles, which are defined as a new clustering created at a point in the space of clusterings from a weighted average of nearby existing clusterings. The local cluster ensemble approach will approximate more possible clusterings as additional clustering methods are employed in step 330, and will never be worse, and usually will be considerably better, in approximating a new clustering than the closest existing observed point. Cluster ensembles having a degree of similarity to other cluster ensembles in excess of a threshold may be pruned.

In step 360, for each cluster or cluster ensemble within each clustering, an exemplar response is identified—that is, given a group of responses that a clustering algorithm has identified as all being similar, one of these responses that exemplifies this similarity is selected. One way to do this is to measure the distance between any two responses based on similarity of the number of common stemmed n-grams in each response, so that the number of stemmed n-grams present in both is used as the measure of similarity between any two responses. For example, the responses "increased voltage to battery" and "increasing volts" both have the stemmed 2-gram "increase volt" in common. The single response in each cluster with the smallest (spatial) distance to the largest number of other responses is identified as the exemplar.

In step 370, the exemplars from all the clusters within all the clusterings are rank-ordered from most to least distinctive. For this purpose, "distinctive" is defined as the distance from (i.e., less similar to) the set of other exemplars, so that the farther an exemplar is from the other exemplars, the higher will be its rank. With reference to FIGS. 1A and 2, in step 380 these exemplars are presented in ranked order to the instructor(s) 130, who will read them to gain a very quick view of the understandings and misunderstandings of students in the class. Alternatively, the exemplars can be used to predict prototypical responses to questions in order to provide choices in a multiple-choice version of the question.

Figure 3:
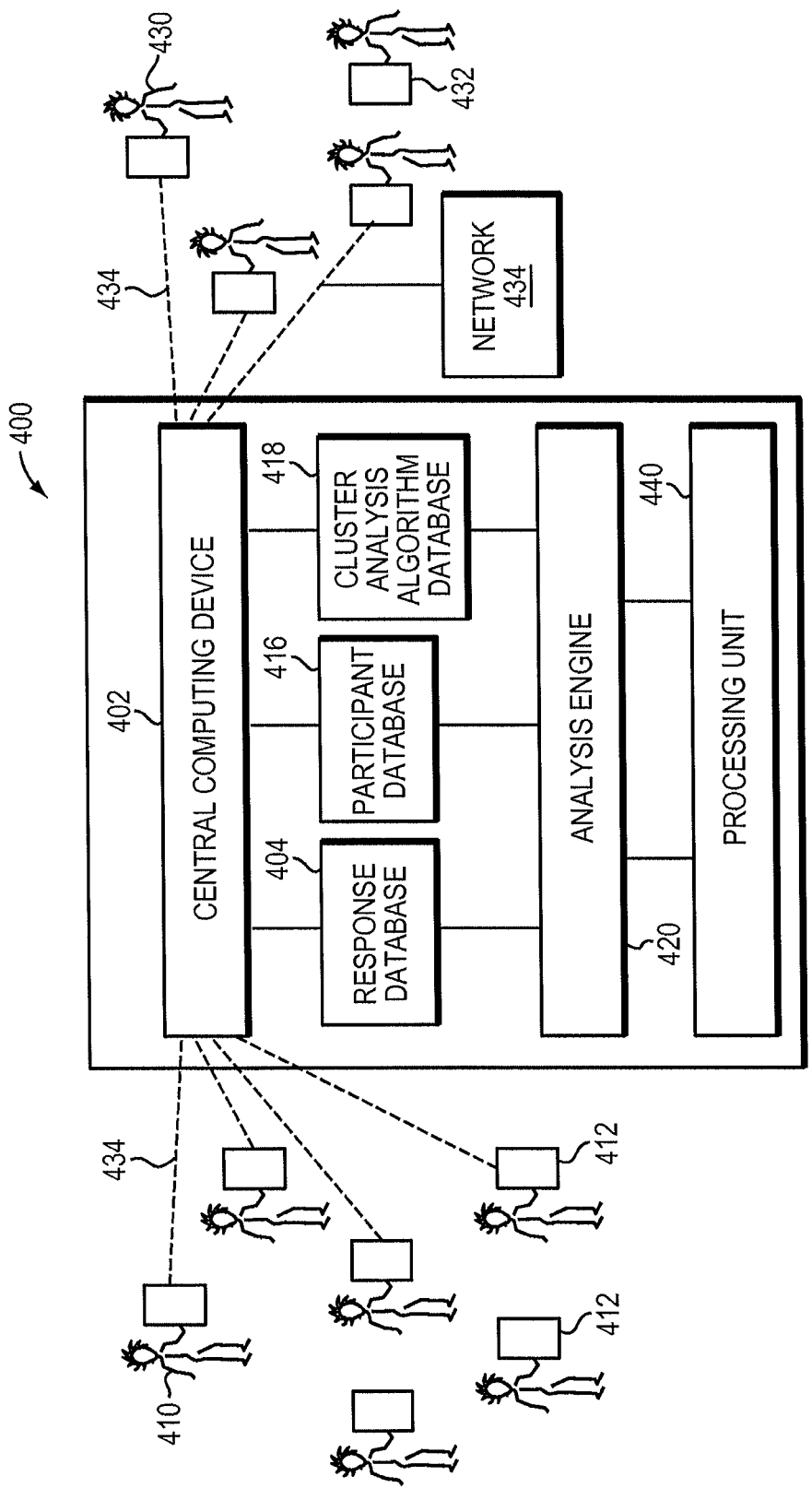
FIG. 3 illustrates a system for analyzing participant response in accordance with embodiments of the current invention.

A representative system 400 for analyzing participants' responses in accordance with embodiments of the current invention is shown in FIG. 3. The system 400 is based on the framework introduced in FIG. 1A, and comprises a central computing device 402 that includes (or is in communication with) a database 404 in which responses are stored. An ungrouped set of participants 410 each has a handheld device 412; as explained above in connection with FIG. 1A, the participants may be co-located or may be geographically dispersed and communicate via a network 434. Items are provided to, and responses are received from participants via the handheld devices 412.

The central computing device 402 includes (or is in communication with) a participant database 416, which contains records for the participants 410 as well as for other individuals who may be used in a training set; the database 416 may contain records relating each participant to a handheld device, for example. A database 418 contains cluster algorithms utilized as described above in connection with analysis of the received responses. The computing device 402 executes an analysis engine 420 that performs the steps shown in FIG. 2, accessing responses stored in the database 404 and performing the clustering analysis described above utilizing the entries in the databases 404, 418. Based on the analysis, the central computing device 402 communicates the exemplars in ranked order to the handheld devices 430 of the instructors 432. Typically, communication with the handheld devices 412 and 432 occurs wirelessly, e.g., by SMS, an automated telephone call, e-mail or other suitable form of communication.

The analysis engine 420 may be implemented by computer-executable instructions, such as program modules, that are executed by a conventional computer. Generally, program modules include routines, programs, objects, components, data structures, etc. that performs particular tasks or implement particular abstract data types. Those skilled in the art will appreciate that the invention may be practiced with various computer system configurations, including multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

The central computing device 402 may comprise or consist of a general-purpose computing device in the form of a computer including a processing unit 440, a system memory, and a system bus that couples various system components including the system memory to the processing unit. During operation, the system memory contains the instructions implementing the analysis engine 420. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the analytical functions described above. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 440 that executes commands and instructions may be a general-purpose processor, but may utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), or any other device or arrangement of devices that is capable of implementing the steps of the processes of the invention.

The network 434 may be a wired or wireless local area network (LAN) and a wide area network (WAN), wireless personal area network (PAN) and/or other types of networks. When used in a LAN networking environment, the central computing device 402 is connected to the LAN through a network interface or adapter. When used in a WAN networking environment, the central computing device 402 may include a modem or other network interface, e.g., a standard telecommunications platform for cellular communication. Mobile devices 412,432 may be connected over the Internet, an Intranet, Extranet, Ethernet, the wireless telecommunications infrastructure, or any other system that provides communications. Some suitable communications protocols may include TCP/IP, UDP, or OSI for example. Furthermore, components of the system may communicate through a combination of wired or wireless paths.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system comprising:
an instructor computing device coupled to a network and receiving, using a Graphical User Interface (GUI), a prompt;
a server comprising a computing device coupled to the network and including a processor executing instructions within a memory which, when executed, cause the system to:
receive, from the instructor computing device, the prompt;
transmit the prompt through the network to at least one user device for display;
receive, at the server, a plurality of responses from the at least one user device, each of the responses in the plurality of responses including a text-based open-ended response;
convert, at the server, each of the plurality of responses, received as a transmission through the network from the at least one user device, into a numerical data set by associating each word in a plurality of words of each response in the plurality of responses with a numerical value;

generate, at the server, using at least one clustering algorithm applied to the numerical data set, a plurality of clusters of responses in the plurality of responses, wherein each cluster in the plurality of clusters does not overlap with each of the other clusters in the plurality of clusters, wherein each cluster in the plurality of clusters is associated with a response type;

calculate at least one distance metric between each of the plurality of clusters by measuring the distance between any two of the plurality of clusters; and automatically generate and transmit to the instructor computing device a report based on the distance metric and comprising an identification of a ranked list of a plurality of example responses that typifies each of the response types;

the at least one user device coupled to the network and configured to:
display the prompt; and
receive, from at least one GUI displayed on the at least one user device, the plurality of responses;

a database coupled to the network and storing:
the plurality of responses; and
the at least one clustering algorithm.

2. The system of claim 1, wherein the at least one user device comprises a plurality of geographically-dispersed user devices, each operated by a separate user.

3. The system of claim 1, wherein the instructor computing device is further configured to:
transmit the prompt to the server;
receive the report from the server; and
display the report.

4. The system of claim 1, further comprising the steps of:
transmitting, by the instructor computing device, the prompt to the server;
receiving, by the instructor computing device, the report from the server; and
displaying, by the instructor computing device, the report.

5. A system comprising:
a server, comprising a computing device coupled to a network and including a processor executing instructions within a memory which, when executed, cause the system to:
receive, using a Graphical User Interface (GUI), from an instructor computing device coupled to the network, a prompt;
transmit the prompt through the network to at least one user device for display;
receive, at the server, a plurality of responses, using at least one GUI displayed on the at the least one user device, each of the responses in the plurality of responses including a text-based open-ended response;
convert, at the server, each of the plurality of responses, each received as a transmission through the network from the at least one user device, into a numerical data set by associating each word in a plurality of words of each response in the plurality of responses with a numerical value;
generate, at the server, using at least one clustering algorithm applied to the numerical data set, a plurality of clusters of responses in the plurality of responses, wherein each cluster in the plurality of clusters does not overlap with each of the other clusters in the plurality of clusters, wherein each cluster in the plurality of clusters is associated with a response type;
calculate a distance metric between each of the plurality of clusters by measuring the distance between any two of the plurality of clusters; and
automatically generate and transmit to the instructor computing device a report based on the distance metric and comprising an identification of a ranked list of a plurality of example responses that typifies each of the response types.

6. The system of claim 5, wherein the instructions further cause the system to convert each of the responses in the plurality of responses into numerical vectors.

7. The system of claim 5, wherein the instructions further cause the system to generate the plurality of clusters according to at least one characteristic stored in the database in association with each of a plurality of users that input the plurality of responses.

8. The system of claim 5, wherein the instructions further cause the system to remove punctuation from the plurality of responses prior to converting each of the plurality of responses into the numerical data set, wherein the numerical data set results from the removal of the punctuation.

9. The system of claim 5, wherein the instructions further cause the system to identify a single cluster as a weighted average of the plurality of clusters.

10. The system of claim 5, wherein the instructions further cause the system to include within the report a plurality of textual responses corresponding to the plurality of example responses.

11. The system of claim 5, wherein the instructions further cause the system to identify the plurality of example responses by measuring the distance between two of the plurality of responses based on a similarity of a number of common stemmed n-grams in each response.

12. A method comprising:
receiving, by a server comprising a computing device coupled to a network and including a processor executing instructions within a memory, using a Graphical User Interface (GUI), from an instructor computing device coupled to the network, a prompt;
transmitting, by the server, the prompt through the network to at least one user device for display;
receiving, by the server, a plurality of responses, using at least one GUI displayed on the at least one user device, each of the responses in the plurality of responses including a text-based open-ended response;
converting, by the server, each of the plurality of responses, received as a transmission through the network from the at least one user device, into a numerical data set by associating each word in a plurality of words of each response in the plurality of responses with a numerical value;
generating, by the server using at least one clustering algorithm applied to the numerical data set, a plurality of clusters of responses in the plurality of responses, wherein each cluster in the plurality of clusters does not overlap with each of the other clusters in the plurality of clusters, wherein each cluster in the plurality of clusters is associated with a response type;
calculating, by the server, a distance metric between each of the plurality of clusters by measuring the distance between any two of the plurality of clusters; and
automatically generating and transmitting to the instructor computing device, by the server, a report based on the distance metric and comprising an identification of a ranked list of a plurality of example responses that typifies each of the response types.

13. The method of claim 12, further comprising the step of converting, by the server, each of the responses in the plurality of responses into numerical vectors.

14. The method of claim 12, further comprising the step of generating, by the server, the plurality of clusters according to at least one characteristic stored in the database in association with each of a plurality of users that input the plurality of responses.

15. The method of claim 12, wherein the instructions further cause the system to remove punctuation from the plurality of responses prior to converting each of the plurality of responses into the numerical data set, wherein the numerical data set results from the removal of the punctuation.

16. The method of claim 12, further comprising the step of identifying, by the server, a single cluster as a weighted average of the plurality of clusters.

17. The method of claim 12, further comprising the step of including, by the server, within the report a plurality of textual responses corresponding to the plurality of example responses.

18. The method of claim 12, further comprising the step of identifying, by the server, the plurality of example responses by measuring the distance between two of the plurality of responses based on a similarity of a number of common stemmed n-grams in each response.

19. The method of claim 12, wherein the at least one user device comprises a plurality of geographically-dispersed user devices, each operated by a separate user.

* * * * *